United States Patent
Iwasaki et al.

(10) Patent No.: US 8,044,149 B2
(45) Date of Patent: Oct. 25, 2011

(54) PROCESS FOR PRODUCTION OF HYDROGENATED POLYMERS AND HYDROGENATED POLYMERS

(75) Inventors: Hideharu Iwasaki, Kurashiki (JP); Yasutaka Inubushi, Kurashiki (JP)

(73) Assignee: Kuraray Co., Ltd., Kurashiki-shi (JP)

( * ) Notice: Subject to any disclaimer, the term of this patent is extended or adjusted under 35 U.S.C. 154(b) by 315 days.

(21) Appl. No.: 12/442,305

(22) PCT Filed: Sep. 20, 2007

(86) PCT No.: PCT/JP2007/068250
§ 371 (c)(1),
(2), (4) Date: Mar. 20, 2009

(87) PCT Pub. No.: WO2008/035731
PCT Pub. Date: Mar. 27, 2008

(65) Prior Publication Data
US 2010/0029874 A1    Feb. 4, 2010

(30) Foreign Application Priority Data

Sep. 22, 2006    (JP) .................................. 2006-257863

(51) Int. Cl.
C08F 8/42    (2006.01)
(52) U.S. Cl. ...................... 525/338; 525/332.1; 525/339
(58) Field of Classification Search .................. 525/338, 525/339
See application file for complete search history.

(56) References Cited

U.S. PATENT DOCUMENTS

| 5,932,664 A | 8/1999 | Chen et al. |
| 6,559,241 B2 | 5/2003 | Iwasaki et al. |
| 2002/0185630 A1 | 12/2002 | Piccinelli et al. |
| 2005/0014916 A1 | 1/2005 | Sakamoto et al. |
| 2006/0149009 A1 | 7/2006 | Arimoto et al. |
| 2009/0023874 A1 | 1/2009 | Iwasaki et al. |

FOREIGN PATENT DOCUMENTS

| EP | 1 598 384 A1 | 11/2005 |
| EP | 1 621 572 A1 | 2/2006 |
| JP | 7-2929 | 1/1995 |
| JP | 10-195182 | 7/1998 |
| JP | 11-158256 | 6/1999 |
| JP | 11-510807 | 9/1999 |
| JP | 2001-163958 | 6/2001 |
| JP | 2002-509961 | 4/2002 |
| JP | 2002-525397 | 8/2002 |
| JP | 2002-348360 | 12/2002 |
| JP | 2003-96167 | 4/2003 |
| WO | WO 97/06185 | 2/1997 |
| WO | WO 99/50331 | 10/1999 |
| WO | WO 00/18579 | 4/2000 |
| WO | WO 2004/076523 | 9/2004 |

OTHER PUBLICATIONS

D. E. Fogg, et al. "Ligand manipulation and design for ruthenium metathesis and tandem metathesis-hydrogenation catalysis" Journal of Molecular Catalysis A: vol. 190, 2002, pp. 177-184.

Toshihiro Ohtsuki, et al. "Development and Commercialization of Hydrogenated Ring-Opening Metathesis Polymers" JSR Technical Review, No. 108, 2001, pp. 19-26, with English Abstract.

Shokyoku Kanaoka, et al. "Synthesis of Block Copolymers of Silicon-Containing Norbornene Derivatives via Living Ring-Opening Metathesis Polymerization Catalyzed by a Ruthenium Carbene Complex" Macromolecules, American Chemical Society, vol. 28, Jan. 31, 1995, pp. 4707-4713.

Primary Examiner — Bernard Lipman
(74) Attorney, Agent, or Firm — Oblon, Spivak, McClelland, Maier & Neustadt, L.L.P.

(57) ABSTRACT

Provision of, in a process of producing a hydrogenated polymer, which comprises steps of sequentially performing, in the presence of a ruthenium carbene complex, a ring-opening metathesis polymerization reaction of a cyclic olefin and a hydrogenation reaction of a ring-opening metathesis polymer produced by the polymerization reaction to give a hydrogenated polymer, a simple and economic process of obtaining a hydrogenated polymer having an extremely small content of residual ruthenium derived from the ruthenium carbene complex.

A process of producing a hydrogenated polymer, which comprises, in the presence of a ruthenium carbene complex, subjecting a cyclic monoolefin and/or a cyclic diolefin to a ring-opening metathesis polymerization, hydrogenating the resulting ring-opening metathesis polymer to give a hydrogenated polymer, and bringing the hydrogenated polymer in contact with a poor solvent of the hydrogenated polymer in the presence of dissolved hydrogen to allow precipitation. As the poor solvent of the hydrogenated polymer, alcohol having 1 to 6 carbon atoms, ketone having 3 to 6 carbon atoms and the like are preferable.

14 Claims, No Drawings

PROCESS FOR PRODUCTION OF HYDROGENATED POLYMERS AND HYDROGENATED POLYMERS

TECHNICAL FIELD

The present invention relates to a process of producing a hydrogenated polymer effective for the production of a pharmaceutical agent or an agrochemical intermediate, production of engineering plastic and the like and a hydrogenated polymer obtained by the process.

BACKGROUND ART

Conventionally, redistribution of an ethylenic double bond (metathesis reaction) using a carbene complex represented by the following formula 4

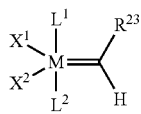

(4)

wherein M is selected from the group consisting of Os and Ru, $X^1$ and $X^2$ are each independently selected from anion ligands, $L^1$ and $L^2$ are each independently selected from neutral electron donors, $R^{23}$ is selected from a hydrogen atom, a substituted or unsubstituted alkyl group and a substituted or unsubstituted aryl group is widely known (e.g., patent document 1). Furthermore, a method comprising using a carbene complex for a polymerization reaction, and directly using the complex as a catalyst for a hydrogenation reaction is also known (e.g., patent documents 2-5 and non-patent document 1).

A polymer obtained by hydrogenation of a polymer obtained by a metathesis reaction contains a large amount of a heavy metal derived from a catalyst used for the metathesis reaction or hydrogenation reaction. The presence of a large amount of a heavy metal in the hydrogenated polymer gives rise to the problems of coloring of resin and decreased heat resistance. Therefore, various methods for removing the residual catalyst have heretofore been studied. As such example, a method of removing a residual catalyst by the use of an adsorbent such as activated carbon, activated clay and the like is known (see patent document 6). This method, however, requires treatment of a polymer solution with the adsorbent, which increases the amount of the adsorbent to be used, and is economically disadvantageous. Moreover, the method is associated with the problems of easily deteriorated operability as evidenced by abnormal increase in the fluid pressure during the treatment step and the like, and easy contamination of polymer with adsorbent fine particles due to pulverization thereof. As a method of removing a residual catalyst, moreover, a method comprising repeating an operation to treat the resultant polymer with a poor solvent to allow precipitation is known (see non-patent document 1). Nevertheless, such method is hardly an industrial one since the operation is troublesome.

patent document 1: National Publication of International Patent Application No. H11-510807
patent document 2: JP-A-10-195182
patent document 3: JP-A-2002-348360
patent document 4: National Publication of International Patent Application No. 2002-509961
patent document 5: National Publication of International Patent Application No. 2002-525397
patent document 6: JP-A-2001-163958
non-patent document 1: Journal of Molecular Catalysis A; Chemical Vol. 190 (2002) pages 177-184

DISCLOSURE OF THE INVENTION

Problem to be Solved by the Invention

In view of the above-mentioned situation, the problem to be solved by the present invention is to provide a process to obtain a hydrogenated polymer comprising the steps of obtaining the hydrogenated polymer by successively performing ring-opening metathesis polymerization reaction of cyclic olefin and hydrogenation of the ring-opening metathesis polymer produced by the ring-opening metathesis polymerization reaction, both in the presence of a ruthenium carbene complex, for example, without adding a hydrogenation catalyst other than the ruthenium carbene complex used, wherein the hydrogenated polymer with an extremely low content of the residual ruthenium derived from the ruthenium carbene complex can be obtained conveniently and economically.

Means of Solving the Problems

The present inventors have conducted intensive studies in an attempt to solve the aforementioned problems and found that a hydrogenated polymer with an extremely low content of the residual ruthenium can be obtained by performing a ring-opening metathesis polymerization of cyclic olefin in the presence of a ruthenium carbene complex, hydrogenating the resulting ring-opening metathesis polymer and bringing the obtained hydrogenated polymer in contact with a poor solvent of the hydrogenated polymer in the presence of dissolved hydrogen to allow precipitation, which resulted in the completion of the present invention.

Accordingly, the present invention relates to
[1] a process of producing a hydrogenated polymer, which comprises, in the presence of a ruthenium carbene complex, subjecting at least one kind of a cyclic olefin selected from a cyclic monoolefin represented by the following formula 1

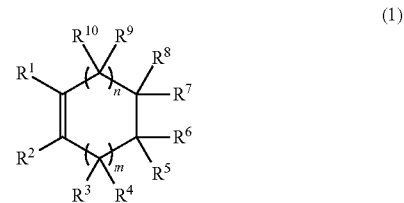

(1)

wherein $R^1$, $R^2$, $R^3$, $R^4$, $R^5$, $R^6$, $R^7$, $R^8$, $R^9$ and $R^{10}$ are each a hydrogen atom, a halogen atom, an optionally substituted alkyl group, an optionally substituted cycloalkyl group, an optionally substituted aryl group, a hydroxyl group, an alkoxy group, a carbonyl group, an ester group, a carboxyl group or a salt of a carboxyl group, wherein any plural members thereof optionally form a cyclic structure together with carbon atoms bonded thereto, and m and n are each an integer of 0 to 4, wherein the total number of m and n is not less than 3, and a cyclic diolefin represented by the following formula 2

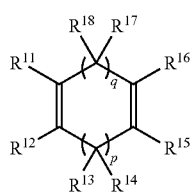

(2)

wherein $R^{11}$, $R^{12}$, $R^{13}$, $R^{14}$, $R^{15}$, $R^{16}$, $R^{17}$ and $R^{18}$ are each a hydrogen atom, a halogen atom, an optionally substituted alkyl group, an optionally substituted cycloalkyl group, an optionally substituted aryl group, a hydroxyl group, an alkoxy group, a carbonyl group, an ester group, a carboxyl group or a salt of a carboxyl group, wherein any plural members thereof optionally form a cyclic structure together with carbon atoms bonded thereto, and p and q are each an integer of 0 to 4, wherein the total number of p and q is not less than 3, to a ring-opening metathesis polymerization, hydrogenating the resulting ring-opening metathesis polymer to give a hydrogenated polymer and bringing the hydrogenated polymer in contact with a poor solvent of the hydrogenated polymer to allow precipitation, wherein the hydrogenated polymer is brought into contact with the poor solvent in the presence of dissolved hydrogen,

[2] the process of the above-mentioned [1], wherein the ruthenium carbene complex has a structure represented by the following formula 3

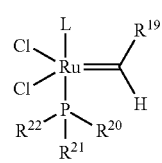

(3)

wherein $R^{19}$ is selected from the group consisting of a hydrogen atom, an optionally substituted alkyl group, an optionally substituted alkenyl group, an optionally substituted cycloalkyl group and an optionally substituted aryl group, $R^{20}$, $R^{21}$ and $R^{22}$ are each selected from the group consisting of a hydrogen atom, an optionally substituted alkyl group, an optionally substituted cycloalkyl group and an optionally substituted aryl group, and L is selected from neutral electron donors,

[3] the process of the above-mentioned [1] or [2], wherein the ring-opening metathesis polymerization and the hydrogenation of the ring-opening metathesis polymer are performed in the presence of a secondary alcohol,

[4] the process of any of the above-mentioned [1] to [3], which further comprises adding a basic substance to a reaction mixture containing the ring-opening metathesis polymer prior to the hydrogenation of the ring-opening metathesis polymer,

[5] the process of any of the above-mentioned [1] to [4], wherein the ring-opening metathesis polymer is hydrogenated by a continuous reaction method,

[6] the process of the above-mentioned [5], wherein the hydrogenation of the ring-opening metathesis polymer by the continuous reaction method is performed in a complete mixing tank—a plug flow reactor,

[7] the process of any of the above-mentioned [1] to [6], wherein the poor solvent of the hydrogenated polymer is an alcohol having 1 to 6 carbon atoms,

[8] the process of any of the above-mentioned [1] to [6], wherein the poor solvent of the hydrogenated polymer is a ketone having 3 to 6 carbon atoms, and

[9] a hydrogenated polymer produced by the process of any of the above-mentioned [1] to [8].

Effect of the Invention

The process of the present invention can produce a hydrogenated polymer with an extremely low residual ruthenium content conveniently and economically.

BEST MODE FOR EMBODYING THE INVENTION

The present invention is explained in more detail in the following.

The ruthenium carbene complex to be used in the ring-opening metathesis polymerization step of the present invention is not particularly limited and may be any as long as it shows a catalyst action in a ring-opening metathesis polymerization reaction. For example, a complex having a structure of the following formula 3

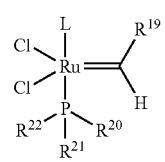

(3)

wherein $R^{19}$ is selected from the group consisting of a hydrogen atom, an optionally substituted alkyl group, an optionally substituted alkenyl group, an optionally substituted cycloalkyl group and an optionally substituted aryl group, $R^{20}$, $R^{21}$ and $R^{22}$ are each selected from the group consisting of a hydrogen atom, an optionally substituted alkyl group, an optionally substituted cycloalkyl group and an optionally substituted aryl group, and L is selected from neutral electron donors, can be mentioned.

Preferable examples of the "optionally substituted alkyl group" for $R^{19}$ of the formula 3 include an alkyl group having 1 to 20 carbon atoms (preferably 1 to 8 carbon atoms) such as methyl group, ethyl group, butyl group, octyl group and the like, a substituted alkyl group wherein the alkyl group is substituted by an aryl group such as phenyl group, tolyl group, xylyl group, mesityl group, naphthyl group and the like; a hydroxyl group; an alkoxy group having 1 to 20 carbon atoms (preferably 1 to 8 carbon atoms) such as methoxy group, ethoxy group, butoxy group and the like; a carbonyloxy group having 2 to 20 carbon atoms (preferably having 2 to 8 carbon atoms) such as acetoxy group, propionyloxy group, hexanoyloxy group, benzoyloxy group and the like; and the like, and the like.

Preferable examples of the "optionally substituted alkenyl group" for $R^{19}$ in the formula 3 include an alkenyl group having 2 to 20 carbon atoms (preferably having 2 to 8 carbon atoms) such as ethenyl group, propenyl group, butenyl group, octenyl group and the like, a substituted alkenyl group wherein the alkenyl group is substituted by an alkyl group having 1 to 20 carbon atoms (preferably having 1 to 8 carbon atoms) such as methyl group, ethyl group, butyl group, octyl group and the like; an aryl group such as phenyl group, tolyl group, xylyl group, mesityl group, naphthyl group and the like; a hydroxyl group; an alkoxy group having 1 to 20 carbon atoms (preferably having 1 to 8 carbon atoms) such as methoxy group, ethoxy group, butoxy group and the like; a carbonyloxy group having 2 to 20 carbon atoms (preferably having 2 to 8 carbon atoms) such as acetoxy group, propionyloxy group, hexanoyloxy group, benzoyloxy group and the like; and the like, and the like.

Preferable examples of the "optionally substituted cycloalkyl group" for $R^{19}$ in the formula 3 include a cycloalkyl group such as cyclopentyl group, cyclohexyl group and the like, a substituted cycloalkyl group wherein the cycloalkyl group is substituted by an alkyl group having 1 to 20 carbon atoms (preferably having 1 to 8 carbon atoms) such as methyl group, ethyl group, butyl group, octyl group and the like; an aryl group such as phenyl group, tolyl group, xylyl group, mesityl group, naphthyl group and the like; a hydroxyl group; an alkoxy group having 1 to 20 carbon atoms (preferably having 1 to 8 carbon atoms) such as methoxy group, ethoxy group, butoxy group and the like; a carbonyloxy group having 2 to 20 carbon atoms (preferably having 2 to 8 carbon atoms) such as acetoxy group, propionyloxy group, hexanoyloxy group, benzoyloxy group and the like; and the like, and the like.

Preferable examples of the "optionally substituted aryl group" for $R^{19}$ in the formula 3 include an aryl group such as phenyl group, naphthyl group and the like, a substituted aryl group wherein the aryl group is substituted by an alkyl group having 1 to 20 carbon atoms (preferably 1 to 8 carbon atoms) such as methyl group, ethyl group, butyl group, octyl group and the like; an aryl group such as phenyl group, tolyl group, xylyl group, mesityl group, naphthyl group and the like; a hydroxyl group; an alkoxy group having 1 to 20 carbon atoms (preferably having 1 to 8 carbon atoms) such as methoxy group, ethoxy group, butoxy group and the like; and the like, and the like.

In the "optionally substituted alkyl group", "optionally substituted alkenyl group", "optionally substituted cycloalkyl group" or "optionally substituted aryl group" for $R^{19}$ in the formula 3, the number of substituents is preferably 0-6, more preferably 0-3, which may be substituted at any substitutable position(s).

In the ruthenium carbene complex of the formula 3, $R^{19}$ is preferably an optionally substituted alkyl group, an optionally substituted alkenyl group or an optionally substituted aryl group.

In the formula 3, $R^{20}$, $R^{21}$ and $R^{22}$ may be the same or different, and preferable examples of the "optionally substituted alkyl group" for $R^{20}$, $R^{21}$ or $R^{22}$ include a linear alkyl group having 1 to 10 carbon atoms (preferably 1 to 8 carbon atoms) such as methyl group, ethyl group, butyl group, octyl group and the like; a branched alkyl group having 1 to 10 carbon atoms (preferably 1 to 8 carbon atoms) such as isopropyl group, isobutyl group and the like, a substituted alkyl group wherein the linear or branched alkyl group is substituted by an alkyl group having 1 to 20 carbon atoms (preferably 1 to 8 carbon atoms) such as methyl group, ethyl group, butyl group, octyl group and the like; an aryl group such as phenyl group, tolyl group, xylyl group, mesityl group, naphthyl group and the like; a hydroxyl group; an alkoxy group having 1 to 20 carbon atoms (preferably 1 to 8 carbon atoms) such as methoxy group, ethoxy group, butoxy group and the like; a carbonyloxy group having 2 to 20 carbon atoms (preferably 2 to 8 carbon atoms) such as acetoxy group, propionyloxy group, hexanoyloxy group, benzoyloxy group and the like; and the like, and the like.

Preferable examples of the "optionally substituted cycloalkyl group" for $R^{20}$, $R^{21}$ or $R^{22}$ in the formula 3 include a cycloalkyl group such as cyclopentyl group, cyclohexyl group and the like, a substituted cycloalkyl group wherein the cycloalkyl group is substituted by an alkyl group having 1 to 20 carbon atoms (preferably 1 to 8 carbon atoms) such as methyl group, ethyl group, butyl group, octyl group and the like; an aryl group such as phenyl group, tolyl group, xylyl group, mesityl group, naphthyl group and the like; a hydroxyl group; an alkoxy group having 1 to 20 carbon atoms (preferably 1 to 8 carbon atoms) such as methoxy group, ethoxy group, butoxy group and the like; a carbonyloxy group having 2 to 20 carbon atoms (preferably 2 to 8 carbon atoms) such as acetoxy group, propionyloxy group, hexanoyloxy group, benzoyloxy group and the like; and the like, and the like.

Examples of the "optionally substituted aryl group" for $R^{20}$, $R^{21}$ or $R^{22}$ in the formula 3 include an aryl group such as phenyl group, naphthyl group and the like, a substituted aryl group wherein the aryl group is substituted by an alkyl group having 1 to 20 carbon atoms (preferably 1 to 8 carbon atoms) such as methyl group, ethyl group, butyl group, octyl group and the like; an aryl group such as phenyl group, tolyl group, xylyl group, mesityl group, naphthyl group and the like; a hydroxyl group; an alkoxy group having 1 to 20 carbon atoms (preferably 1 to 8 carbon atoms) such as methoxy group, ethoxy group, butoxy group and the like; and the like, and the like. In the "optionally substituted alkyl group", "optionally substituted cycloalkyl group" and "optionally substituted aryl group", the number of substituents is preferably 0-6, more preferably 0-3, which may be substituted at any substitutable position(s).

In the formula 3, L is a neutral electron donor and, for example, a phosphorus compound represented by the formula 5: $PR^{20}R^{21}R^{22}$ wherein $R^{20}$, $R^{21}$ and $R^{22}$ are as defined above, a nitrogen-containing carbene compound represented by the following formula 6:

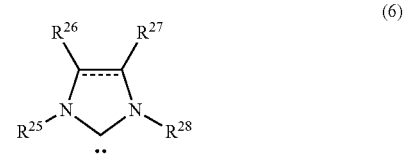

wherein $R^{25}$ and $R^{28}$ are each an optionally substituted alkyl group or an optionally substituted aryl group, $R^{26}$ and $R^{27}$ are each a hydrogen atom, an optionally substituted alkyl group or an optionally substituted aryl group, and ------ shows a single bond or a double bond,
and the like can be mentioned.

In the formula 6, $R^{25}$ and $R^{28}$ may be the same or different, and preferable examples of the "optionally substituted alkyl group" for $R^{25}$ or $R^{28}$ include an alkyl group having 1 to 20 carbon atoms (preferably 1 to 8 carbon atoms) such as methyl group, ethyl group, butyl group, octyl group and the like, a substituted alkyl group wherein the alkyl group is substituted by an aryl group such as phenyl group, tolyl group, xylyl group, mesityl group, naphthyl group and the like; a hydroxyl group; an alkoxy group having 1 to 20 carbon atoms (preferably 1 to 8 carbon atoms) such as methoxy group, ethoxy group, butoxy group and the like; a carbonyloxy group having 2 to 20 carbon atoms (preferably 2 to 8 carbon atoms) such as acetoxy group, propionyloxy group, hexanoyloxy group, benzoyloxy group and the like; and the like.

Preferable examples of the "optionally substituted aryl group" for $R^{25}$ or $R^{28}$ in the formula 6 include an aryl group such as phenyl group, naphthyl group and the like, a substituted aryl group wherein the aryl group is substituted by an alkyl group having 1 to 20 carbon atoms (preferably 1 to 8 carbon atoms) such as methyl group, ethyl group, butyl group, octyl group and the like; an aryl group such as phenyl group, tolyl group, xylyl group, mesityl group, naphthyl group and the like; a hydroxyl group; an alkoxy group having 1 to 5 carbon atoms such as methoxy group, ethoxy group, butoxy group and the like; and the like, and the like. In the "optionally substituted alkyl group" and "optionally substituted aryl group", the number of substituents is preferably 0-6, more preferably 0-3, which may be substituted at any substitutable position(s).

In the ruthenium carbene complex of the formula 3, $R^{25}$ and $R^{28}$ in the formula 6 is each preferably phenyl group, 4-tolyl group, 2-tolyl group, 2,4-xylyl group, mesityl group, naphthyl group or anthranyl group.

In the formula 6, $R^{26}$ and $R^{27}$ may be the same or different, preferable examples of the "optionally substituted alkyl group" for $R^{26}$ or $R^{27}$ include an alkyl group having 1 to 20 carbon atoms (preferably 1 to 8 carbon atoms) such as methyl group, ethyl group, butyl group, octyl group and the like, a substituted alkyl group wherein the alkyl group is substituted by an aryl group such as phenyl group, tolyl group, xylyl group, mesityl group, naphthyl group and the like; a hydroxyl group; an alkoxy group having 1 to 20 carbon atoms (preferably 1 to 8 carbon atoms) such as methoxy group, ethoxy group, butoxy group and the like; carbonyloxy group having 2 to 20 carbon atoms (preferably 2 to 8 carbon atoms) such as acetoxy group, propionyloxy group, hexanoyloxy group, benzoyloxy group and the like; and the like.

In addition, preferable examples of the "optionally substituted aryl group" for $R^{26}$ or $R^{27}$ include an aryl group such as phenyl group, naphthyl group and the like, a substituted aryl group wherein the aryl group is substituted by an alkyl group having 1 to 20 carbon atoms (preferably 1 to 8 carbon atoms) such as methyl group, ethyl group, butyl group, octyl group and the like; an aryl group such as phenyl group, tolyl group, xylyl group, mesityl group, naphthyl group and the like; a hydroxyl group; an alkoxy group having 1 to 5 carbon atoms such as methoxy group, ethoxy group, butoxy group and the like; and the like, and the like.

In the "optionally substituted alkyl group" and "optionally substituted aryl group" for $R^{26}$ or $R^{27}$, the number of substituents is preferably 0-6, more preferably 0-3, which may be substituted at any substitutable position(s).

In the ruthenium carbene complex of the formula 3, $R^{26}$ and $R^{27}$ in the formula 6 are each preferably a hydrogen atom; an alkyl group having 1 to 8 carbon atoms such as methyl group, ethyl group and the like.

Specific examples of the ruthenium carbene complex to be used in the present invention include ruthenium carbene complexes wherein one nitrogen-containing carbene compound and one neutral electron donor other than carbene compounds are bonded such as benzylidene(1,3-dimesitylimidazolidin-2-ylidene)(tricyclohexylphosphine)ruthenium dichloride, (1,3-dimesitylimidazolidin-2-ylidene) (3-methyl-2-buten-1-ylidene)(tricyclopentylphosphine)ruthenium dichloride, benzylidene(1,3-dimesityloctahydrobenzimidazol-2-ylidene)(tricyclohexylphosphine)ruthenium dichloride, benzylidene[1,3-di(1-phenylethyl)-4-imidazolin-2-ylidene](tricyclohexylphosphine)ruthenium dichloride, benzylidene(1,3-dimesityl-2,3-dihydrobenzimidazol-2-ylidene) (tricyclohexylphosphine) ruthenium dichloride, benzylidene (tricyclohexylphosphine)(1,3,4-triphenyl-2,3,4,5-tetrahydro-1H-1,2,4-triazol-5-ylidene)ruthenium dichloride, (1,3-diisopropylhexahydropyrimidin-2-ylidene)(ethoxymethylene)(tricyclohexylphosphine)ruthenium dichloride, benzylidene(1,3-dimesitylimidazolidin-2-ylidene)pyridineruthenium dichloride and the like; ruthenium carbene complexes wherein two nitrogen-containing carbene compounds are bonded such as benzylidenebis(1,3-dicyclohexylimidazolidin-2-ylidene)ruthenium dichloride, benzylidenebis(1,3-diisopropyl-4-imidazolin-2-ylidene) ruthenium dichloride and the like; and ruthenium carbene complexes having one nitrogen-containing carbene compound and a coordinating ether bond in the carbene such as (1,3-dimesitylimidazolidin-2-ylidene) (2-isopropoxyphenylmethylene)ruthenium dichloride, (1,3-dimesitylimidazolidin-2-ylidene) (2-ethoxyphenylmethylene)ruthenium dichloride and the like.

Among these, (1,3-dimesitylimidazolidin-2-ylidene) (2-isopropoxyphenylmethylene)ruthenium dichloride, (1,3-dimesitylimidazolidin-2-ylidene) (2-ethoxyphenylmethylene)ruthenium dichloride, and benzylidene(1,3-dimesitylimidazolidin-2-ylidene)(tricyclohexylphosphine)ruthenium dichloride are preferably used from the aspects of stability in a catalyst solution, activity during ring-opening metathesis polymerization and the like.

The ruthenium carbene complex to be used in the present invention may be a commercially available product or may be prepared as necessary according to a known method.

The amount of the ruthenium carbene complex to be used in the present invention is not particularly limited and varies depending on the manner of reaction, structure of the object product and the like. From the aspects of the production rate and production efficiency of the object product, it is generally within the range of 1/1,000,000-fold mol-1/10-fold mol, preferably 1/500,000-fold mol-1/100-fold mol, relative to the cyclic olefin.

The cyclic olefin to be used in the present invention includes a cyclic monoolefin of the following formula 1:

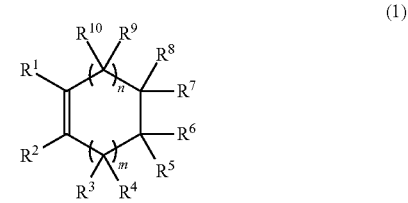

(1)

wherein $R^1$, $R^2$, $R^3$, $R^4$, $R^5$, $R^6$, $R^7$, $R^8$, $R^9$ and $R^{10}$ are each a hydrogen atom, a halogen atom, an optionally substituted alkyl group, an optionally substituted cycloalkyl group, an optionally substituted aryl group, a hydroxyl group, an alkoxy group, a carbonyl group, an ester group, a carboxyl group or a salt of a carboxyl group, wherein any plural members thereof optionally form a cyclic structure together with carbon atoms bonded thereto, and m and n are each an integer of 0 to 4, wherein the total number of m and n is not less than 3, and a cyclic diolefin of the following formula 2:

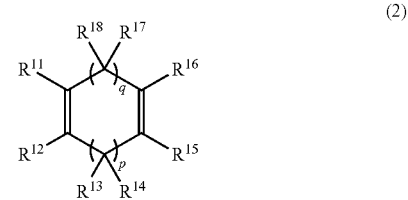

(2)

wherein $R^{11}$, $R^{12}$, $R^{13}$, $R^{14}$, $R^{15}$, $R^{16}$, $R^{17}$ and $R^{18}$ are each a hydrogen atom, a halogen atom, an optionally substituted alkyl group, an optionally substituted cycloalkyl group, an optionally substituted aryl group, a hydroxyl group, an alkoxy group, a carbonyl group, an ester group, a carboxyl group or a salt of a carboxyl group, wherein any plural members thereof optionally form a cyclic structure together with carbon atoms bonded thereto, and p and q are each an integer of 0 to 4, wherein the total number of p and q is not less than 3.

Preferable examples of the "halogen atom" for $R^1$, $R^2$, $R^3$, $R^4 R^5$, $R^6$, $R^7$, $R^8$, $R^9$ or $R^{10}$ in the above-mentioned formula 1, and for $R^{11}$, $R^{12}$, $R^{13}$, $R^{14}$, $R^{15}$, $R^{16}$, $R^{17}$ or $R^{18}$ in the above-mentioned formula 2 include fluorine atom, chlorine atom, bromine atom and the like. Preferable examples of the "optionally substituted alkyl group" include a linear or branched alkyl group having 1 to 20 carbon atoms (preferably having 1 to 8 carbon atoms) such as methyl group, ethyl group, n-propyl group, isopropyl group, n-butyl group, sec-butyl group, tert-butyl group, pentyl group, hexyl group, heptyl group, octyl group, nonyl group, decyl group, cetyl group, stearyl group and the like, a substituted alkyl group wherein the linear or branched alkyl group is substituted by a halogen atom such as fluorine atom, chlorine atom, bromine atom and the like; an alkoxy group such as methoxy group, ethoxy group, n-propoxy group, isopropoxy group, butoxy group and the like; a nitro group; a carboxyl group; an alkoxycarbonyl group such as methoxycarbonyl group, ethoxycarbonyl group and the like; a carbonyloxy group such as acetyloxy group, propionyloxy group and the like; and the like, and the like.

Preferable examples of the "optionally substituted cycloalkyl group" for $R^1$, $R^2$, $R^3$, $R^4$, $R^5$, $R^6$, $R^7$, $R^8$, $R^9$ or $R^{10}$ in the above-mentioned formula 1, and for $R^{11}$, $R^{12}$, $R^{13}$, $R^{14}$, $R^{15}$, $R^{16}$, $R^{17}$ or $R^{18}$ in the above-mentioned formula 2 include cycloalkyl group such as cyclobutyl group, cyclopentyl group, cyclohexyl group, cyclooctyl group and the like, a substituted cycloalkyl group wherein the cycloalkyl group is substituted by a halogen atom such as fluorine atom, chlorine atom, bromine atom and the like; an alkoxy group such as methoxy group, ethoxy group, n-propoxy group, isopropoxy group, butoxy group and the like; a nitro group; a carboxyl group; an alkoxycarbonyl group such as methoxycarbonyl group, ethoxycarbonyl group and the like; a carbonyloxy group such as acetyloxy group, propionyloxy group and the like; and the like, and the like.

Preferable examples of the "optionally substituted aryl group" for $R^1$, $R^2$, $R^3$, $R^4$, $R^5$, $R^6$, $R^7$, $R^8$, $R^9$, or $R^{10}$ in the above mentioned formula 1, and for $R^{11}$, $R^{12}$, $R^{13}$, $R^{14}$, $R^{15}$, $R^{16}$, $R^{17}$ or $R^{18}$ in the above-mentioned formula 2 include an aryl group such as phenyl group, naphthyl group and the like, a substituted aryl group wherein the aryl group is substituted by a halogen atom such as fluorine atom, chlorine atom, bromine atom and the like; an alkoxy group such as methoxy group, ethoxy group, n-propoxy group, isopropoxy group, butoxy group and the like; a nitro group; a carboxyl group; an alkoxycarbonyl group such as methoxycarbonyl group, ethoxycarbonyl group and the like; an acyl group such as acetyl group, propionyl group, benzoyl group and the like; a carbonyloxy group such as acetyloxy group, propionyloxy group and the like; and the like, and the like.

In the "optionally substituted alkyl group", "optionally substituted cycloalkyl group" and "optionally substituted aryl group" for $R^1$, $R^2$, $R^3$, $R^4$, $R^5$, $R^6$, $R^7$, $R^8$, $R^9$ or $R^{10}$ in the above-mentioned formula 1, and for $R^{11}$, $R^{12}$, $R^{13}$, $R^{14}$, $R^{15}$, $R^{16}$, $R^{17}$ or $R^{18}$ in the above-mentioned formula 2, the number of substituents is preferably 0-6, more preferably 0-3, which may be substituted at any substitutable position(s).

Preferable examples of the "alkoxy group" for $R^1$, $R^2$, $R^3$, $R^4$, $R^5$, $R^6$, $R^7$, $R^8$, $R^9$ or $R^{10}$ in the above-mentioned formula 1, and for $R^{11}$, $R^{12}$, $R^{13}$, $R^{14}$, $R^{15}$, $R^{16}$, $R^{17}$ or $R^{18}$ in the above-mentioned formula 2 include methoxy group, ethoxy group, n-propoxy group, isopropoxy group, butoxy group and the like; preferable examples of the "ester group" include acetyloxy group, propionyloxy group, benzoyloxy group and the like; and preferable examples of the "carboxyl group or a salt of a carboxyl group" include alkali metal salt such as sodium salt, potassium salt and the like.

$R^1$, $R^2$, $R^3$, $R^4$, $R^5$, $R^6$, $R^7$, $R^8$, $R^9$ and $R^{10}$ in the above-mentioned formula 1 may be the same or different and $R^{11}$, $R^{12}$, $R^{13}$, $R^{14}$, $R^{15}$, $R^{16}$, $R^{17}$ and $R^{18}$ in the above-mentioned formula 2 may be the same or different. In $R^1$, $R^2$, $R^3$, $R^4$, $R^5$, $R^6$, $R^7$, $R^8$, $R^9$ and $R^{10}$ in the above-mentioned formula 1 and $R^{11}$, $R^{12}$, $R^{13}$, $R^{14}$, $R^{15}$, $R^{16}$, $R^{17}$ and $R^{18}$ in the above-mentioned formula 2, any plural members thereof optionally form a cyclic structure together with carbon atoms bonded thereto. Examples thereof include a cyclic ether such as epoxy group and the like formed by two hydroxyl groups condensed with each other.

When m and n in the above-mentioned formula 1 are each an integer of 2-4, $R^3$ and $R^4$, and $R^9$ and $R^{10}$, each in plurality, may be the same or different (preferably same), and the total number of m and n is preferably 4-8. When p and q in the above-mentioned formula 2 are each an integer of 2-4, $R^{13}$ and $R^{14}$, and $R^{17}$ and $R^{18}$, each in plurality, may be the same or different (preferably same), and the total number of p and q is preferably 4-8.

Specific examples of the cyclic monoolefin represented by the formula 1 (hereinafter to be also referred to as "cyclic monoolefin (1)") include cycloolefins such as cycloheptene, cyclooctene, cyclododecene, 1,5-dimethyl-1-cyclooctene and the like; cycloolefins having a hydroxyl group such as 1,2-dihydroxy-5-cyclooctene, 1,4-dihydroxy-2-cyclooctene, 1-hydroxy-4-cycloheptene and the like; cycloolefins having a halogen atom such as 1-chloro-5-cyclooctene and the like; ether group-containing cycloolefins such as 1,2-dimethoxy-5-cyclooctene, 1,4-dimethoxy-2-cyclooctene, 1-methoxy-4-cycloheptene and the like; and ester group-containing cycloolefins such as 1,2-diacetoxy-5-cyclooctene, 1,4-diacetoxy-2-cyclooctene, 1-acetoxy-4-cycloheptene and the like.

Specific examples of the cyclic diolefin represented by the formula 2 (hereinafter to be also referred to as "cyclic diolefin (2)") include cyclic nonconjugated olefins such as 1,5-cyclooctadiene, 1,5-dimethyl-1,5-cyclooctadiene and the like, and the like.

In the present invention, cyclic monoolefin (1) and cyclic diolefin (2) each may be used alone or in a mixture of two or more kinds thereof.

In the present invention, a ring-opening metathesis polymerization can be performed using cyclic monoolefin (1) and/or cyclic diolefin (2) as a starting material. Unless otherwise specified in the present specification, the "cyclic olefin" refers to either the "cyclic monoolefin (1)", "cyclic diolefin (2)" or "cyclic monoolefin (1) and cyclic diolefin (2)".

In the present invention, the ring-opening metathesis polymerization is preferably performed in the presence of a solvent. While the solvent is not particularly limited, use of a secondary alcohol is preferable since the ring-opening metathesis polymerization reaction proceeds sufficiently. While the secondary alcohol is not particularly limited, for example, one or more kinds selected from isopropanol, 2-butanol, 3-methyl-2-butanol, 2-pentanol, cyclopentanol, 2-hexanol, 3-hexanol, cyclohexanol, 2-octanol, 3-octanol, cyclooctanol and the like can be mentioned. Among these, alcohols having 4 to 8 carbon atoms, such as 2-butanol, 3-methyl-2-butanol, 2-pentanol, cyclopentanol, 2-hexanol, 3-hexanol, cyclohexanol, 2-octanol, 3-octanol, cyclooctanol and the like are preferably used in consideration of the industrial availability, stability of the ruthenium carbene complex, solubility of the ring-opening metathesis polymer to be produced and the hydrogenated polymer and the like.

In the present invention, a cosolvent may be used as necessary in combination with the above-mentioned secondary alcohol during the ring-opening metathesis polymerization reaction. The type of the cosolvent is not particularly limited as long as it does not inhibit the reaction and, for example, saturated hydrocarbons such as hexane, cyclohexane, methylcyclohexane, heptane, octane, cyclooctane and the like; aromatic hydrocarbons such as toluene, xylene, mesitylene and the like; chain ethers such as diethyl ether, isopropyl ether and the like; cyclic ethers such as tetrahydrofuran, tetrahydropyran and the like; esters such as methyl acetate, ethyl acetate, butyl acetate, methyl butyrate, ethyl butyrate, butyl butyrate and the like; halogenated hydrocarbons such as methylene chloride, chloroform, carbon tetrachloride, chlorobenzene and the like; sulfoxides such as dimethyl sulfoxide and the like; sulfolanes such as sulfolane and the like; amides such as dimethylformamide, dimethylacetamide, diethylformamide, diethylacetamide, N-methylpyrrolidone and the like; and the like can be mentioned. Among these, cyclic ethers are preferable in consideration of common use of a solvent up to the hydrogenation and stabilization of the ruthenium carbene complex, and the like.

While the (total) amount of a secondary alcohol, or a secondary alcohol and a cosolvent, to be used for the ring-opening metathesis polymerization reaction is not particularly limited, a secondary alcohol or a secondary alcohol and a cosolvent is(are) preferably used such that the concentration of the ring-opening metathesis polymer is 0.1-50 wt %, more preferably 1-30 wt %, in consideration of the productivity and operability. When a secondary alcohol and a cosolvent are to be used in combination, the rate of use of the cosolvent is preferably not more than 50 wt % and, in consideration of the operability of the polymer and solubility of the hydrogenated polymer during hydrogenation, more preferably not more than 40 wt %, of the total weight of the secondary alcohol and the cosolvent.

In the ring-opening metathesis polymerization reaction of the present invention, a chain transfer agent represented by the following formula 7:

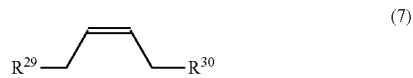

(7)

wherein $R^{29}$ and $R^{30}$ are the same or different and each is a hydrogen atom, an optionally substituted alkyl group, an optionally substituted cycloalkyl group, an optionally substituted aryl group, an optionally substituted alkoxy group, an optionally substituted aryloxy group, an optionally substituted ester group or a halogen atom, and the like may be used. Using a chain transfer agent, the amount of the ruthenium carbene complex to be used can be reduced, and a ring-opening metathesis polymer having a functional group introduced into the both terminals can be obtained easily.

Preferable examples of the "optionally substituted alkyl group" for $R^{29}$ or $R^{30}$ in the formula 7 include a linear or branched alkyl group having 1 to 10 carbon atoms such as methyl group, ethyl group, n-propyl group, isopropyl group, n-butyl group, sec-butyl group, tert-butyl group, pentyl group, hexyl group, heptyl group, octyl group, nonyl group, decyl group and the like, and the like. Preferable examples of the "optionally substituted cycloalkyl group" for $R^{29}$ or $R^{30}$ in the formula 7 include a cycloalkyl group having 5 to 10 carbon atoms such as cyclopentyl group, cyclohexyl group, cyclooctyl group and the like, and the like. Preferable examples of the "optionally substituted aryl group" for $R^{29}$ or $R^{30}$ in the formula 7 include an aromatic hydrocarbon having 6 to 20 carbon atoms such as phenyl group, naphthyl group and the like, and the like. Preferable examples of the "optionally substituted alkoxy group" for $R^{29}$ or $R^{30}$ in the formula 7 include methoxy group, ethoxy group, n-propoxy group, isopropoxy group, butoxy group, methoxymethyloxy group and the like. Preferable examples of the "optionally substituted aryloxy group" for $R^{29}$ or $R^{30}$ in the formula 7 include phenoxy group, naphthyloxy group and the like. Preferable examples of the "optionally substituted ester group" for $R^{29}$ or $R^{30}$ in the formula 7 include methoxycarbonyl group, ethoxycarbonyl group, n-propoxycarbonyl group, isopropoxycarbonyl group, butoxycarbonyl group and the like.

When a chain transfer agent is used, the amount thereof to be used varies depending on the object molecular weight of the polymer. However, it is generally 1/1,000,000-fold mol to 1/10-fold mol, and preferably 1/200,000-fold mol to 1/50-fold mol in consideration of the economic aspect and reaction rate, relative to the cyclic olefin.

Specific examples of the chain transfer agent include cis-2-butene, cis-3-hexene, cis-4-octene, cis-2-butene-1,4-diol, cis-2-butene-1,4-diacetate, cis-4-hexen-1-ol and the like.

The ring-opening metathesis polymerization reaction in the present invention is preferably performed in an inert gas. The ring-opening metathesis polymerization reaction may be performed under inert gas pressurization depending on the chain transfer agent and the solvent to be used.

While the reaction temperature of the ring-opening metathesis polymerization reaction in the present invention is not particularly limited, too low a temperature prevents progress of the ring-opening metathesis polymerization reaction and causes decomposition of a catalyst to markedly decrease catalyst efficiency. On the other hand, too high a temperature causes remetathesis of polymer due to the catalyst, possibly increasing the molecular weight strikingly and also increasing the possibility of the ruthenium carbene complex being decomposed due to hydrogen extraction from the solvent to be used and the like. Therefore, the reaction is performed within the range of generally 20° C. to 130° C., more preferably 30° C. to 110° C.

Specific examples of the ring-opening metathesis polymerization reaction in the present invention include a method based on a batch method including placing polymerization starting materials (cyclic olefin), a solvent and the like earlier in a reactor, then adding a ruthenium carbene complex to allow reaction, a method including placing a ruthenium carbene complex alone or in a mixture with polymerization starting materials (cyclic olefin), a solvent and the like in a reaction system by a piston flow method, which is an embodiment in what is called a continuous system (continuous reaction method) and the like.

In the process of producing the hydrogenated polymer of the present invention, the ring-opening metathesis polymer obtained as mentioned above is hydrogenated in the presence of a ruthenium carbene complex. For hydrogenation of a ring-opening metathesis polymer, a ring-opening metathesis polymerization reaction solution can be treated as is under a hydrogen atmosphere without isolating the ring-opening metathesis polymer. In this case, the ruthenium carbene complex used for the ring-opening metathesis polymerization reaction is considered to also function as a catalyst for the hydrogenation reaction of the ring-opening metathesis polymer.

The solvent to be used in the hydrogenation reaction of the ring-opening metathesis polymer is not particularly limited. When the above-mentioned solvent (including cosolvent) is used for the ring-opening metathesis polymerization reaction, the hydrogenation reaction can be directly performed in the presence of the solvent. When desired, the same or different solvent may be further added to the above-mentioned solvent used for the ring-opening metathesis polymerization reaction. Examples of the different solvent include the solvents exemplified above for the ring-opening metathesis polymerization reaction except the solvent actually used for the reaction. As the solvent to be used for the hydrogenation reaction, the same solvent as the one used for the ring-opening metathesis polymerization reaction is preferably used at least, and the ring-opening metathesis polymerization and hydrogenation of a ring-opening metathesis polymer are particularly preferably performed in the presence of a secondary alcohol.

In the present invention, when the reaction mixture obtained by the above-mentioned ring-opening metathesis polymerization reaction is subjected to a hydrogenation reaction directly or after addition of a solvent when desired, since the ruthenium carbene complex used in the ring-opening metathesis polymerization reaction also functions as a catalyst for a hydrogenation reaction as mentioned above, addition of a new catalyst is not particularly necessary. As long as the effect of the invention is not impaired, however, the same or different ruthenium carbene complex as those used in the ring-opening metathesis polymerization reaction may be added.

Prior to the hydrogenation reaction of a ring-opening metathesis polymer, moreover, a basic substance can be added to the reaction mixture obtained by the ring-opening metathesis polymerization reaction. Addition of such a basic substance is preferable since a ruthenium carbene complex easily forms a hydride complex, which is a hydrogenated active form, in an alcohol solvent and enhances the stability of the ruthenium carbene complex. In the present invention, the hydrogenation reaction can be performed in the presence of a ruthenium carbene complex used for the ring-opening metathesis polymerization reaction. The valence, ligand and the like of a part or the entirety of the ruthenium carbene complex may change due to the addition of the basic substance.

The basic substance usable in the present invention is not particularly limited. From the aspects of stability of a ruthenium carbene complex under hydrogenated conditions and improvement of hydrogenation efficiency, however, tertiary amine or tertiary phosphine is preferable. Examples of the tertiary amine include trimethylamine, triethylamine, tributylamine, trioctylamine, N-methylpyrrolidine, N-methylpiperidine, N-methylmorpholine, N,N-dimethylaniline, N,N-dimethylaminopyridine and the like, and examples of the tertiary phosphine include trimethylphosphine, triethylphosphine, tributylphosphine, trioctylphosphine, triphenylphosphine and the like. Any one alone or a mixture of plural kinds of these may be used. Particularly, in consideration of the stability and the like, use of at least triphenylphosphine is preferable.

While the amount of the basic substance to be used in the present invention is not particularly limited, it is generally 0.1- to 10000-fold mol, and preferably 0.5- to 5000-fold mol in consideration of the economic efficiency and operability, relative to the ruthenium carbene complex to be used. When such basic substance is added, it may be added to a reaction mixture before hydrogenation or may be diluted with a solvent or cosolvent to be used for the hydrogenation and then added.

The hydrogenation reaction in the present invention may be performed by a batch method or continuous reaction method. Since the reaction efficiency (particularly, volume efficiency) is higher, the continuous reaction method is preferable. Examples of the continuous reaction method include a method using a single complete mixing tank, a method using a plurality of complete mixing tanks, a method including connecting different kinds of reaction apparatuses, for example, connecting a complete mixing tank with a plug flow reactor (a complete mixing tank—a plug flow reactor) and the like, and the like.

Specific examples of the above-mentioned method using a single complete mixing tank include a method comprising continuously supplying a polymerization reaction mixture of a ring-opening metathesis polymer to a complete mixing tank such that a desired average detention period is achieved, and thereafter extracting the resultant product from the reaction system by a method such as overflow and the like, and the like. Specific examples of the above-mentioned method including connecting a plurality of complete mixing tanks include a method comprising continuously supplying a polymerization reaction mixture of the ring-opening metathesis polymer to a complete mixing tank, extracting the reaction mixture by a method such as overflow and the like, supplying the reaction mixture into another stirring tank and the like to further progress the reaction and the like. Specific examples of the above-mentioned method including connecting different kinds of reaction apparatuses include a method comprising continuously supplying the polymerization reaction mixture of the ring-opening metathesis polymer to a complete mixing tank to progress the reaction to achieve a desired conversion ratio, and supplying the reaction mixture to a reaction apparatus for a flow method such as a plug flow reactor and the like to further progress the reaction and the like. Among the above-mentioned methods, a method including connecting different kinds of reaction apparatuses, such as a complete mixing tank—a plug flow reactor and the like, is preferably employed, since a higher reaction efficiency can be achieved. While a stirring tank can be used as the above-mentioned complete mixing tank, the hydrogenation efficiency can be enhanced by the use of reaction facility such as a loop reactor and the like.

While the hydrogen pressure during the hydrogenation reaction is not particularly limited, it is generally 0.1 MPa-20 MPa in consideration of the reaction rate and reaction selectivity, and preferably 1 MPa-15 MPa in consideration of the special reactor, reaction efficiency by dissolved hydrogen. In the present specification, the pressure means an absolute pressure.

While the reaction temperature of the hydrogenation reaction of the present invention is not particularly limited, it is generally 30° C. to 250° C. in consideration of the solubility of hydrogenated polymer and the hydrogenation efficiency, and preferably 50° C. to 200° C. in consideration of the reaction operability.

It is needless to say that the time required for hydrogenation in the present invention (average detention period in the case of a continuous reaction method) largely depends on the reaction substrate to be used and the reaction conditions to be employed. However, the average detention period is generally 1-20 hr, preferably 2-15 hr in consideration of the reaction efficiency.

While the hydrogenation ratio of the hydrogenated polymer in the process of producing the hydrogenated polymer in the present invention can be controlled variously according to the use of the hydrogenated polymer, it is preferably 50-100 mol %, more preferably 70-100 mol %, still more preferably 90-100 mol %, since a hydrogenated polymer superior in the weatherability, heat resistance and the like can be obtained easily. The hydrogenation ratio in the present specification is a ratio of the number of moles of the hydrogen molecule used for the hydrogenation to the number of moles of the total double bonds possessed by the ring-opening metathesis polymer. The hydrogenation ratio can be determined by measuring the hydrogenated polymer by $^1$H-NMR.

The obtained hydrogenated polymer is precipitated by bringing the polymer in contact with a poor solvent of the hydrogenated polymer in the presence of dissolved hydrogen. Here, the "poor solvent of the hydrogenated polymer" refers to a solvent in which the solubility of a hydrogenated polymer at 20° C. is not more than 1 g/solvent (100 g). The hydrogenated polymer precipitated by contact with a poor solvent can be separated by filtration, decantation and the like from the solvent and starting materials used in the ring-opening metathesis polymerization reaction and hydrogenation reaction. The separated hydrogenated polymer is preferably further subjected to drying and the like under normal pressure or under reduced pressure to remove residual solvent and starting materials.

The above-mentioned poor solvent is appropriately selected according to the kind of the object hydrogenated polymer and specific examples thereof include alcohol having 1 to 6 carbon atoms (preferably 1 to 4 carbon atoms) such as methanol, ethanol, n-propanol, isopropanol, butanol, 2-butanol, tert-butanol, 1-pentanol, 2-pentanol, isoamyl alcohol, tert-amyl alcohol and the like, ketone having 3 to 6 carbon atoms (preferably 3 to 5 carbon atoms) such as acetone, methyl ethyl ketone, diethyl ketone, methyl n-propyl ketone, methyl isopropyl ketone, methyl butyl ketone, methyl isobutyl ketone, pinacolone and the like, and the like. Among these solvents, methanol is particularly preferable in view of operability, easy availability, small solubility of hydrogenated polymer and the like.

In the present invention, a hydrogenated polymer is brought into contact with a poor solvent of the hydrogenated polymer essentially in the presence of dissolved hydrogen. As a result, the ruthenium carbene complex in the reaction mixture can maintain solubility in the solvent, which in turn is considered to enable suppression of contamination of the hydrogenated polymer with ruthenium due to the precipitation of the ruthenium carbene complex. Hydrogen is preferably dissolved in at least one of the reaction mixture after hydrogenation reaction (the reaction mixture containing hydrogenated polymer) and a poor solvent of the hydrogenated polymer.

In the present invention, a hydrogenated polymer is brought into contact with a poor solvent of the hydrogenated polymer in the presence of dissolved hydrogen by, for example, mixing the reaction mixture after hydrogenation reaction (the reaction mixture containing hydrogenated polymer) with a poor solvent of a hydrogenated polymer under a hydrogen atmosphere. While the hydrogen partial pressure at that time is not particularly limited, the atmospheric hydrogen partial pressure is, for example, preferably 0.001-10 MPa, more preferably 0.01-1 MPa. Using such atmospheric hydrogen partial pressure, hydrogen can be sufficiently dissolved in the reaction mixture after hydrogenation reaction (the reaction mixture containing hydrogenated polymer) or a poor solvent of the hydrogenated polymer.

In the present invention, the temperature during contact of a hydrogenated polymer with a poor solvent of the hydrogenated polymer in the presence of dissolved hydrogen is not particularly limited. In consideration of the solubility of hydrogen and operability, it is preferably within the range of 0° C. to 60° C., more preferably within the range of 10° C. to 40° C.

While the amount of the poor solvent of the hydrogenated polymer to be used in the present invention is not particularly limited, it is preferably 0.1- to 1000-fold weight in consideration of the dispersibility of the precipitated hydrogenated polymer and operability, and more preferably 1- to 100-fold weight in consideration of operability and economic efficiency relative to the hydrogenated polymer.

According to the process of the present invention, a hydrogenated polymer with an extremely small residual ruthenium content derived from a ruthenium carbene complex can be obtained with good efficiency by a comparatively simple step. The hydrogenated polymer produced by the process of the present invention has a ruthenium content of preferably not more than 5 ppm, more preferably not more than 1 ppm, still more preferably not more than 0.5 ppm, and particularly preferably not more than 0.3 ppm. While the number average molecular weight of the hydrogenated polymer obtained by the process of the present invention can be appropriately adjusted according to use and the like, it is preferably 1,000-500,000, more preferably 2,000-300,000.

The hydrogenated polymer obtained by the present invention can be directly formed into various molded products such as film, sheet, tube, fiber and the like, or formed after adding conventionally known pigment, filler, clay, flaky clay, stabilizer, press aid, plasticizer, flame-retardant, anti-fog agent, dye and the like. As the molding method, various molding methods such as injection molding, blow molding, extrusion, compression molding, drawing, vacuum molding and the like can be employed. Moreover, the hydrogenated polymer can be used as the form of a laminate structure or composite product of the hydrogenated polymer of the present invention and other materials. The thus-obtained molded product can be preferably used for an industrial supply, industrial material, household goods and the like.

EXAMPLES

The present invention is explained in detail in the following by referring to Examples and Comparative Examples, which are not to be construed as limitative. In the following Examples, the number average molecular weight and residual ruthenium content of the hydrogenated polymer were analyzed as follows.

[Number Average Molecular Weight of Hydrogenated Polymer]

Using gel permeation chromatography (150C.ALC/GPC) apparatus manufactured by Waters Corporation (column: HFIP806M manufactured by Shodex), the measurement was performed at 40° C. As a measurement solvent, 20 mM sodium trifluoroacetate-hexafluoroisopropanol solution was used. As the standard substance, polymethyl methacrylate was used.

[Residual Ruthenium Content of Hydrogenated Polymer]

Using ICP (inductively-coupled plasma) emission spectrophotometer (IRISAP) manufactured by Jarrell-Ash Corporation, the measurement was performed. As a standard sample, Ruthenium.ICP/DCP (DC plasma) standard solution manufactured by Aldrich Corporation was used.

Example 1

A 500 mL glass three-necked flask equipped with a stirrer and a thermometer was substituted with dry nitrogen, and a solution containing 5-cyclooctene-1,2-diol (45 g, 0.32 mol), cis-4-octene (197 mg, 1.76 mmol), cyclohexanol (157 g) and THF (58 g) (solution-1) was placed therein.

Benzylidene(1,3-dimesitylimidazolidin-2-ylidene)(tricyclohexylphosphine)ruthenium dichloride (11.9 mg, 14.0 μmol) was dissolved in THF (10 g), added to the abovementioned mixed solution, immediately, and ring-opening metathesis polymerization (ROMP) was performed at 55° C. 1 hr later, disappearance of 5-cyclooctene-1,2-diol was confirmed by the analysis of gas chromatography (GC-14B manufactured by SHIMADZU Corporation; column: G-100 manufactured by Chemicals Inspection & Testing Institute, Japan). Then, cyclohexanol (30 mL) was added to the reaction mixture to give a solution (solution-2).

The above-mentioned solution-2 was continuously added at a rate of 5 mL/hr into a 100 mL autoclave adjusted to 8 MPa hydrogen pressure. The hydrogenated reaction mixture was extracted from the 100 mL autoclave at a rate of 5 mL/hr to maintain the liquid level, and the extracted hydrogenated reaction mixture was fed into a 100 mL plug flow reactor to maintain 8 MPa hydrogen pressure, whereby a hydrogenation reaction was performed by a continuous reaction method. The reaction temperature of the hydrogenation reaction was 140° C. for both the autoclave and plug flow reactor. The total amount of solution-2 was fed into the 100 mL autoclave, and cyclohexanol (150 mL) was fed at the same rate (5 mL/hr) to ensure substitution of the whole liquid. The reaction mixture obtained from the plug flow reactor was continuously poured into methanol (300 mL) at 20° C. under a nitrogen and hydrogen atmosphere (hydrogen partial pressure: 0.01 MPa) to allow precipitation of the hydrogenated polymer. The solvent was removed under nitrogen pressurization to give a polymer (44 g) having a number average molecular weight of 58,000. The hydrogenation ratio of the obtained hydrogenated polymer was 98.5 mol % by $^1$H-NMR analysis. In addition, the ruthenium residual amount was not more than 1 ppm by ICP emission method.

Example 2

By an operation similar to that in Example 1 except addition of triethylamine (1.0 g, 9.9 mmol) after completion of the polymerization, a polymer (44 g) having a number average molecular weight of 58,000 was obtained. The hydrogenation ratio of the obtained hydrogenated polymer was 99.2 mol % by $^1$H-NMR analysis. In addition, the ruthenium residual amount was not more than 1 ppm by ICP emission method.

Example 3

By an operation similar to that in Example 1 except addition of triphenylphosphine (1.0 g, 3.8 mmol) after completion of the polymerization and feeding rate of 7 ml/hr, a polymer (44 g) having a number average molecular weight of 58,000 was obtained. The hydrogenation ratio of the obtained hydrogenated polymer was 98.3 mol % by $^1$H-NMR analysis. In addition, the ruthenium residual amount was not more than 1 ppm by ICP emission method.

Example 4

By an operation similar to that in Example 1 except use of acetone (300 mL) instead of methanol (300 mL), a polymer (43 g) having a number average molecular weight of 58,000 was obtained. The hydrogenation ratio of the obtained hydrogenated polymer was 98.1 mol % by $^1$H-NMR analysis. In addition, the ruthenium residual amount was not more than 1 ppm by ICP emission method.

Example 5

By an operation similar to that in Example 1 except the reaction mixture obtained from the plug flow reactor was cooled to 20° C. under a nitrogen atmosphere and directly poured into methanol without the nitrogen and hydrogen atmosphere (hydrogen partial pressure: 0.01 MPa), a polymer (44 g) having a number average molecular weight of 58,000 was obtained. The hydrogenation ratio of the obtained hydrogenated polymer was 98.5 mol % by $^1$H-NMR analysis. In addition, the ruthenium residual amount was 5 ppm by ICP emission method.

Comparative Example 1

By a reaction similar to that in Example 1 except nitrogen was passed through the reaction mixture obtained from the plug flow reactor, hydrogen was removed, the mixture was cooled to 20° C., and poured into methanol, a polymer (44 g) having a number average molecular weight of 58,000 was obtained. The hydrogenation ratio of the obtained hydrogenated polymer was 98.4 mol % by $^1$H-NMR analysis. In addition, the ruthenium residual amount was 8 ppm by ICP emission method.

Comparative Example 2

By a reaction similar to that in Example 1 except nitrogen was passed through the reaction mixture obtained from the plug flow reactor, hydrogen was removed, nitrogen substitution and air substitution were successively performed, the mixture was cooled to 20° C. under atmosphere, and poured into methanol, a polymer (44 g) having a number average molecular weight of 58,000 was obtained. The hydrogenation ratio of the obtained hydrogenated polymer was 98.4 mol % by $^1$H-NMR analysis. In addition, the ruthenium residual amount was 11 ppm by ICP emission method.

INDUSTRIAL APPLICABILITY

According to the present invention, a hydrogenated polymer with a small residual ruthenium content can be obtained easily and economically. Such a hydrogenated polymer can be preferably used for an industrial supply, industrial material, household goods and the like as various formed products such as film, sheet, tube, fiber and the like, or as the form of a laminate structure or composite product with other materials.

This application is based on application No. 2006-257863 filed in Japan, the contents of which are incorporated hereinto by reference.

The invention claimed is:

1. A process of producing a hydrogenated polymer, which comprises:

subjecting, in the presence of a ruthenium carbene complex, at least one kind of a cyclic olefin selected from a cyclic monoolefin represented by formula 1

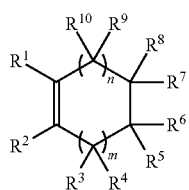

(1)

wherein $R^1$, $R^2$, $R^3$, $R^4$, $R^5$, $R^6$, $R^7$, $R^8$, $R^9$ and $R^{10}$ are each a hydrogen atom, a halogen atom, an optionally substituted alkyl group, an optionally substituted cycloalkyl group, an optionally substituted aryl group, a hydroxyl group, an alkoxy group, a carbonyl group, an ester group, a carboxyl group or a salt of a carboxyl group, wherein any plural members thereof optionally form a cyclic structure together with carbon atoms bonded thereto, and m and n are each an integer of 0 to 4, wherein the total number of m and n is not less than 3, and a cyclic diolefin represented by formula 2

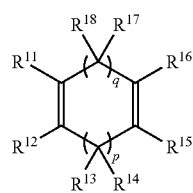

(2)

wherein $R^{11}$, $R^{12}$, $R^{13}$, $R^{14}$, $R^{15}$, $R^{16}$, $R^{17}$ and $R^{18}$ are each a hydrogen atom, a halogen atom, an optionally substituted alkyl group, an optionally substituted cycloalkyl group, an optionally substituted aryl group, a hydroxyl group, an alkoxy group, a carbonyl group, an ester group, a carboxyl group or a salt of a carboxyl group, wherein any plural members thereof optionally form a cyclic structure together with carbon atoms bonded thereto, and p and q are each an integer of 0 to 4, wherein the total number of p and q is not less than 3, to a ring-opening metathesis polymerization;

hydrogenating the resulting ring-opening metathesis polymer to obtain a reaction mixture comprising a hydrogenated polymer; and mixing the reaction mixture with a poor solvent of the hydrogenated polymer under a hydrogen atmosphere to contact the hydrogenated polymer with the poor solvent in the presence of dissolved hydrogen and to allow precipitation.

2. The process of claim 1, wherein the ruthenium carbene complex has a structure represented by formula 3

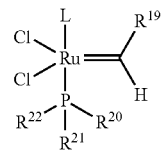

(3)

wherein $R^{19}$ is selected from the group consisting of a hydrogen atom, an optionally substituted alkyl group, an optionally substituted alkenyl group, an optionally substituted cycloalkyl group and an optionally substituted aryl group, $R^{20}$, $R^{21}$ and $R^{22}$ are each selected from the group consisting of a hydrogen atom, an optionally substituted alkyl group, an optionally substituted cycloalkyl group and an optionally substituted aryl group, and L is a neutral electron donor.

3. The process of claim 1, wherein the ring-opening metathesis polymerization and the hydrogenation of the ring-opening metathesis polymer occur in the presence of a secondary alcohol.

4. The process of claim 1, which further comprises adding a basic substance to a reaction mixture comprising the ring-opening metathesis polymer prior to the hydrogenation of the ring-opening metathesis polymer.

5. The process of claim 1, wherein the ring-opening metathesis polymer is hydrogenated by a continuous reaction method.

6. The process of claim 5, wherein the hydrogenation of the ring-opening metathesis polymer by the continuous reaction method is performed in a complete mixing tank—a plug flow reactor.

7. The process of claim 1, wherein the poor solvent of the hydrogenated polymer is an alcohol having 1 to 6 carbon atoms.

8. The process of claim 1, wherein the poor solvent of the hydrogenated polymer is a ketone having 3 to 6 carbon atoms.

9. A hydrogenated polymer produced by the process of claim 1, wherein the hydrogenated polymer has a ruthenium content of not more than 1 ppm.

10. The process of claim 1, wherein the reaction mixture is mixed with the poor solvent under the hydrogen atmosphere having an atmospheric hydrogen partial pressure of 0.001-10 MPa.

11. The process of claim 1, wherein the reaction mixture is mixed with the poor solvent under the hydrogen atmosphere having an atmospheric hydrogen partial pressure of 0.001-1 MPa.

12. The process of claim 4, wherein the basic substance comprises at least one of tertiary amine and tertiary phosphine.

13. The process of claim 4, wherein the basic substance comprises triphenylphosphine.

14. The hydrogenated polymer of claim 9, wherein the hydrogenated polymer has a ruthenium content of not more than 0.3 ppm.

* * * * *